(12) United States Patent
Bissonnette (10) Patent No.: US 6,896,199 B2
(45) Date of Patent: May 24, 2005

(54) WASHING APPARATUS FOR MULTIPLE VEHICLE SURFACES

(75) Inventor: Lee A. Bissonnette, Clarkston, MI (US)

(73) Assignee: Valeo Electrical Systems, Inc., Auburn Hills, MI (US)

(*) Notice: Subject to any disclaimer, the term of this patent is extended or adjusted under 35 U.S.C. 154(b) by 175 days.

(21) Appl. No.: 10/160,492

(22) Filed: May 31, 2002

(65) Prior Publication Data

US 2003/0222156 A1 Dec. 4, 2003

(51) Int. Cl.[7] .............................................. F23D 14/66
(52) U.S. Cl. ........................ 239/128; 239/130; 239/135; 239/139; 239/284.1
(58) Field of Search ................................. 239/128, 130, 239/135, 139, 284.1, 284.2

(56) References Cited

U.S. PATENT DOCUMENTS

| | | | |
|---|---|---|---|
| 3,902,217 A | 9/1975 | Botz et al. ............... | 15/250.02 |
| 4,090,668 A | 5/1978 | Kochenour ................ | 239/130 |
| 4,248,383 A | 2/1981 | Savage et al. ............. | 239/284 |
| 4,383,645 A * | 5/1983 | Figiel et al. .................. | 239/13 |
| 4,508,957 A | 4/1985 | Rocchitelli .................. | 219/305 |
| 4,679,983 A | 7/1987 | Pietryk et al. ............. | 415/152 |
| 5,118,040 A | 6/1992 | Abe ........................ | 139/294.1 |
| 5,509,606 A | 4/1996 | Breithaupt et al. ......... | 239/130 |
| 5,957,384 A | 9/1999 | Lansinger ................ | 239/284.1 |
| 6,029,908 A | 2/2000 | Petzold ..................... | 239/284 |
| 6,032,324 A | 3/2000 | Lansinger ................ | 15/250.04 |
| 6,133,546 A | 10/2000 | Bains ......................... | 219/202 |
| 6,164,564 A | 12/2000 | Franco et al. ............ | 239/284.1 |

FOREIGN PATENT DOCUMENTS

| | | |
|---|---|---|
| DE | 26 28 179 A1 | 1/1978 |
| DE | 34 30 653 | 8/1984 |
| DE | 3507900 | 9/1986 |
| DE | 40 25 732 A1 | 2/1992 |
| EP | 0 271 318 | 6/1988 |
| EP | 0 782 946 A1 | 7/1997 |
| EP | 1 006 030 | 11/1999 |
| FR | 2 636 903 | 3/1990 |
| FR | 2 655 599 | 6/1991 |
| FR | 2707230 | 7/1993 |
| FR | 2 738 203 | 3/1997 |
| GB | 2 271 276 | 4/1994 |
| JP | 4-38248 | 2/1992 |
| WO | WO 98/49036 | 11/1998 |
| WO | WO 98/58826 | 12/1998 |
| WO | WO 99/56993 | 11/1999 |

OTHER PUBLICATIONS

Valeo Info. In–House Magazine #42, Dec. 2001.
International PCT Search Report for PCT/US 03/16926, dated Sep. 1, 2003.

* cited by examiner

Primary Examiner—David A. Scherbel
Assistant Examiner—Thach H. Bui
(74) Attorney, Agent, or Firm—Young & Basile, P.C.

(57) ABSTRACT

A vehicle exterior surface wash apparatus includes a source of pressurized fluid having a pump which is operable in one of two different outlet flow directions and/or one of two different outlet flow pressures. Distribution conduits extend from the pump to fluid nozzles for dispensing fluid over selected exterior surfaces. A valve is connected in each fluid distribution path to select one of the fluid paths for fluid flow depending upon the valve position. An optional heater may be interposed with the fluid distribution path to supply heated fluid to at least one of the exterior surfaces.

9 Claims, 9 Drawing Sheets

WASHING APPARATUS FOR MULTIPLE VEHICLE SURFACES

BACKGROUND

The present invention relates, in general, to vehicle exterior surface wash systems for washing multiple vehicle surfaces, including windshields, backlights, exterior mirrors, headlights, rain and proximity sensors, etc.

Vehicle wash systems typically include a wash fluid reservoir, a pump, distribution conduits, and one or more nozzles or jets which disperse water under pressure onto a vehicle surface to be cleaned. The nozzles or jets may be mounted on or disposed in close proximity to wiping devices, such as wiper blades, or may constitute a high pressure jet stream for removing debris and films from the surfaces to be cleaned to insure adequate visibility through the surfaces, such as windshields, backbites and mirrors or the proper operation of the device on which the surface is mounted, such as headlights, rain and proximity sensors, etc.

Although a separate pump, distribution conduit(s), and one or more nozzles or jets can be employed with each cleanable surface, in the interest of efficiency and cost effectiveness, a singe pump is typically employed with multiple surfaces. Either controls are provided for reversing the direction of the pump to direct fluid through one of two distinct distribution conduits for selectively spraying fluid onto different surfaces, such as the front windshield or the rear backlight window of a vehicle. Alternately, a switch device, such as a manual, pneumatically or electrically controlled valve, is provided with a single pump and switchable between two positions, each of which is connected to a separate, distinct wash fluid distribution path.

It is also possible to connect a single distribution pathway to nozzles associated with two distinct cleanable surfaces, such as the headlights and the front windshield so as to enable the pump to dispense cleaning fluid from the reservoir to each of the surfaces at the same time.

In cleaning applications, it is known that hot fluid removes dirt and other debris from a surface much better and much faster than colder fluids. Vehicle windshield wash systems have employed heated fluids. Typically, a fluid heater device is mounted in the wash fluid distribution path, typically between the pump and the spray nozzles to heat the fluid to a high temperature prior to immediate dispensing through the nozzle(s).

Thus, it would be desirable to provide a vehicle surface wash apparatus which can be efficiently designed with a minimum number of components to effect selective, independent wash fluid distribution onto multiple vehicle surfaces under selective operator control. It would also be desirable to provide a vehicle surface wash apparatus which can be combined with a wash fluid heater to dispense heated wash fluid onto one or more vehicle surfaces.

SUMMARY

The present invention is a vehicle exterior surface wash apparatus for applying pressurized wash fluid to at least one of a plurality of vehicle exterior surfaces.

The apparatus includes a source of pressurized wash fluid. Fluid distribution means, cooperative with the source of pressurized wash fluid, distributes fluid from the source to at least three different exterior vehicle surfaces. Valve means are coupled to the fluid distribution means and switchable to direct fluid to at least one of the three different vehicles surfaces.

In one aspect of the invention, the source of pressurized wash fluid includes a wash fluid reservoir coupled to a pump. The pump is operable at at least two different fluid discharge pressures and in one and preferably two outlet fluid flow directions.

In one aspect, the valve means is a pressure responsive valve automatically responsive to different fluid pressures for switching between at least two positions. In another aspect, the valve means is an electrically operated valve switchable between at least two positions.

In another aspect, an optional heater means is fluidically coupled between the pump and the washable vehicle surfaces for heating fluid prior to distribution onto the washable surfaces.

The wash apparatus of the present invention provides an efficient and cost effective vehicle surface wash apparatus which contains a minimum number of components to effect selective, independent wash fluid distribution onto multiple vehicle surfaces under selective operator control. The apparatus can be combined with a heater to combine heated wash fluid on the vehicle exterior surfaces. The apparatus, in certain aspects, includes pressure responsive and fluid flow responsive valve means and fluid distribution means for automatically distributing fluid to selective surfaces merely by selecting the flow direction and outlet pressure of a pump.

BRIEF DESCRIPTION OF THE DRAWINGS

The various features, advantages and other uses of the present invention will become more apparent by referring to the following detail description and drawing in which.

DETAILED DESCRIPTION

Figure 1:
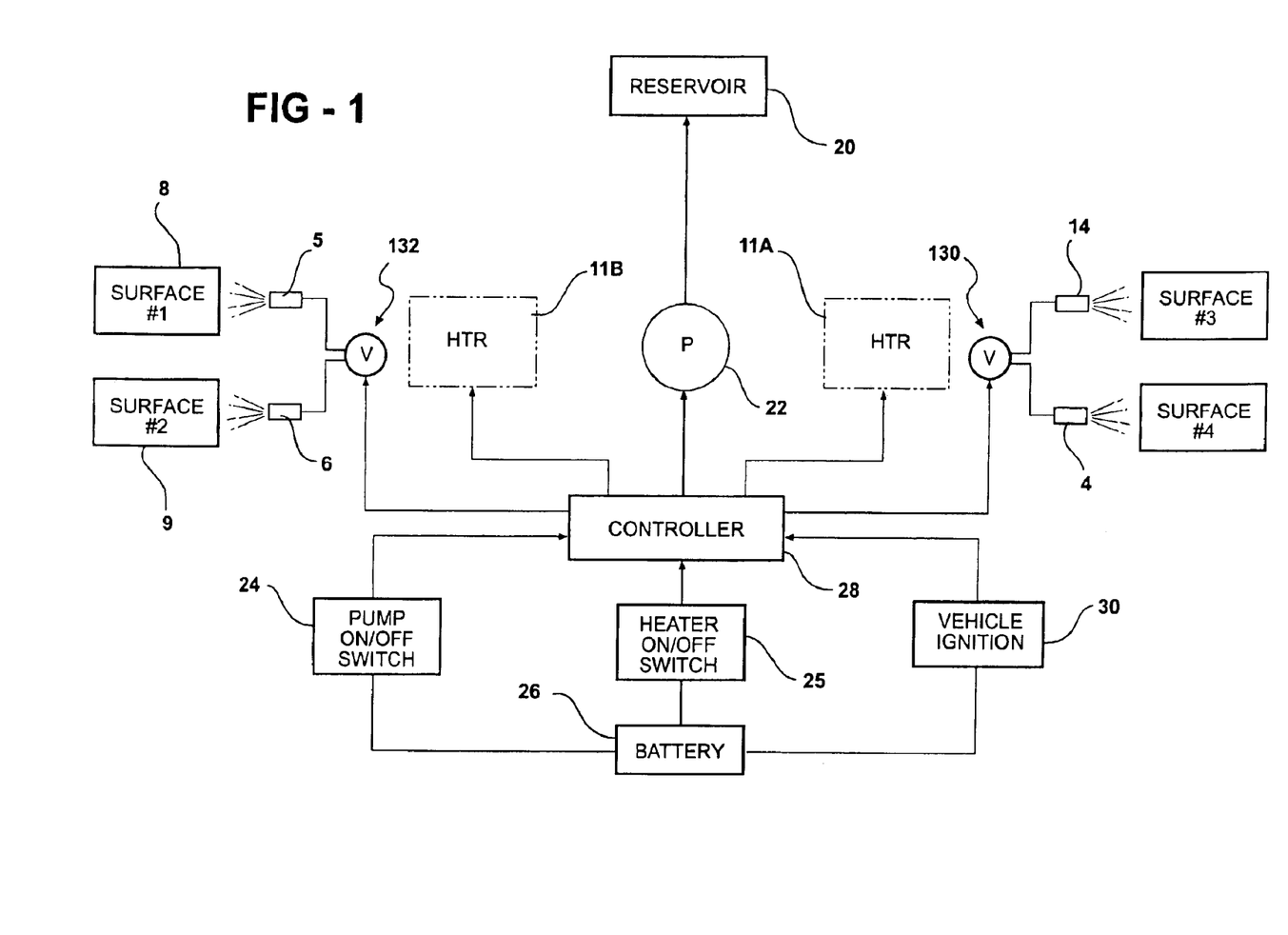
FIG. 1 is a block system diagram of a vehicle surface wash apparatus according to the present invention.

Referring now to FIG. 1, there is depicted an environment in which a wash fluid delivery apparatus 10 constructed in accordance with the teachings of the present invention can be advantageously utilized. The following use of the apparatus 10 of the present invention is described in conjunction with a vehicle window wash system, will be understood to include use as a wash system used to clean any vehicle surface, i.e., windshield, rear backlight, or side windows, as well as vehicle mirrors, camera lenses, rain and proximity sensor covers, headlights, etc.

As is conventional, a vehicle window 12, such as a windshield, rear backlight or side window, etc., has one or more fluid delivery devices, such as spray nozzles 14 located in a position to dispense or spray a pattern 16 of wash fluid onto the exterior surface of the window 12. The dispersion of the wash fluid 16 is usually in conjunction with activation of a windshield wiper, not shown, over the window 12.

According to the present invention, other vehicle surfaces to be cleaned include surfaces 7, 8 and 9 with respective spray nozzles or fluid distribution outlets, 4, 5, and 6, respectively. Additional surfaces 7, 8 and 9 can be any surface on a vehicle which needs to be cleaned by the application of wash fluid. Thus, the surfaces 7, 8 and 9 can be any of the vehicle side window(s), the rear backlight, external mirrors, headlight and/or taillights, camera lenses, rain and proximity sensor covers, etc.

Before describing the surface selection fluid switching means of the present invention, a brief description will be presented of the optional heater 11A and/or 11B which may be used with any or all of the multiple fluid distribution paths employed in the present invention.

The wash fluid 16 is supplied from a fluid source, such as a reservoir or container 20. The fluid in the reservoir 20 is pumped to the nozzle(s) 14 by means of a pump 22 usually located in close proximity or attached to the reservoir 20.

As is conventional, a surface select switch 24, which may be mounted on a vehicle steering column stalk switch, is supplied with power from the vehicle battery 26 and enables the vehicle driver to control the on or off operation of the wash pump 22.

The wash fluid pumped from the reservoir 20 to the spray nozzles 14 is optionally heated from ambient temperature to a predetermined higher temperature, such as 160° F.–170° F., by example only, by a heater module 11. A suitable control circuit or controller 28 is provided for controlling the operation of the heater elements in the heater module 10. The controller 28 is also supplied with electric power from the vehicle battery 26. The controller 28 is activated by a "on" signal from the vehicle ignition 30 so as to heat the fluid contained within the flow paths in the heater module 10, as described hereafter, whenever the vehicle ignition is in an "on" state.

An optional on/off switch 25 may be connected between the battery 26 and the controller 28 to provide on and off operation for the entire heater system by disconnecting power to the controller 28. This enables the heater system to be activated or remain in an inactive state at the selection of the vehicle driver. As described hereafter, the on/off switch 25 may also be replaced by a separate input signal to the controller 28 from an external signal source, such as a vehicle body controller, to provide for selective deactivation of the heater module 10 under certain circumstances, such as a thermal event, low battery power, etc.

Referring now to FIGS. 2–10, there is depicted one aspect of the heater module 10 according to the present invention.

Figure 2:
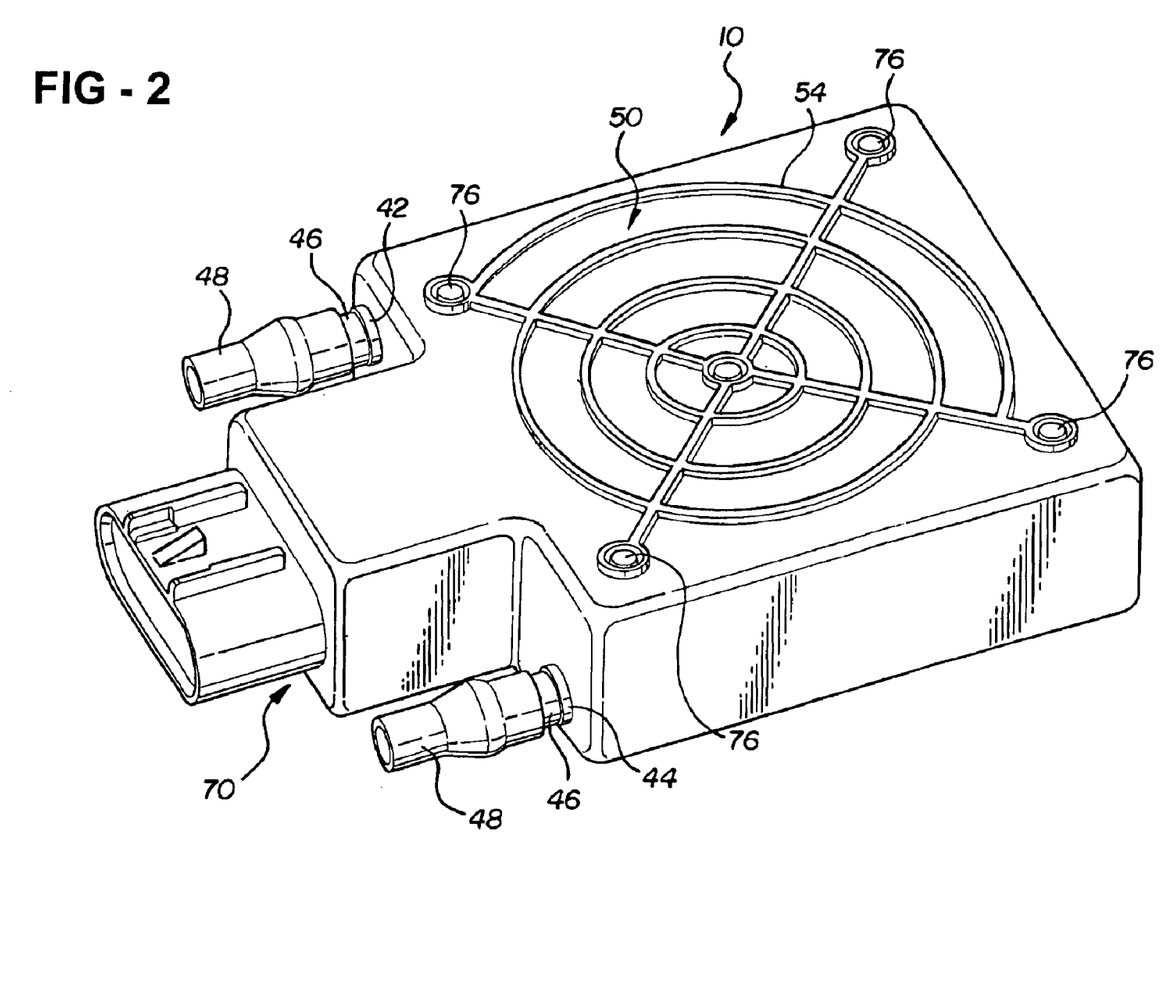
FIG. 2 is a perspective view of a fluid heater module according to one aspect of the present invention.
Figure 3:
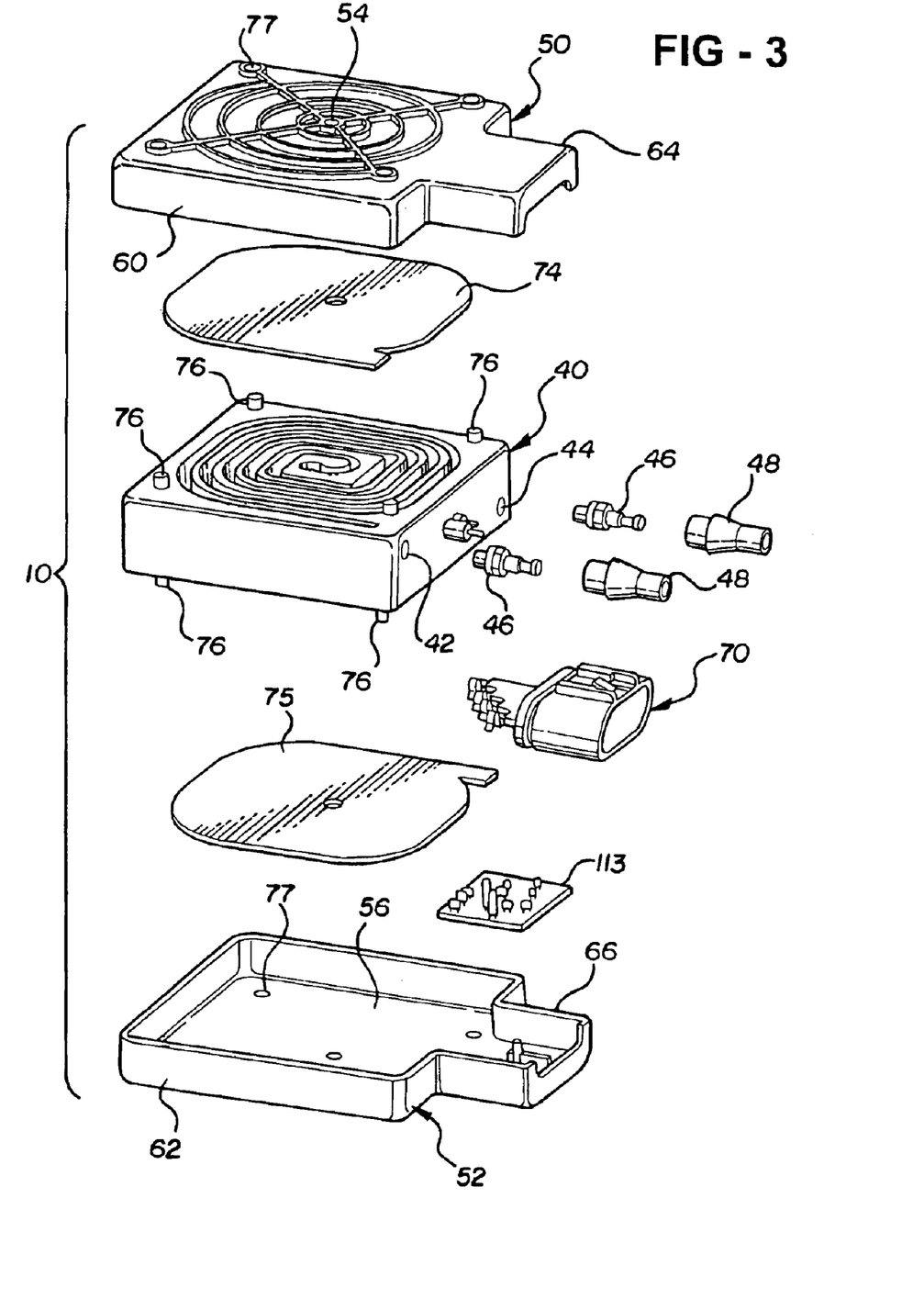
FIG. 3 is an exploded perspective view of the heater module shown in FIG. 2.
Figure 4:
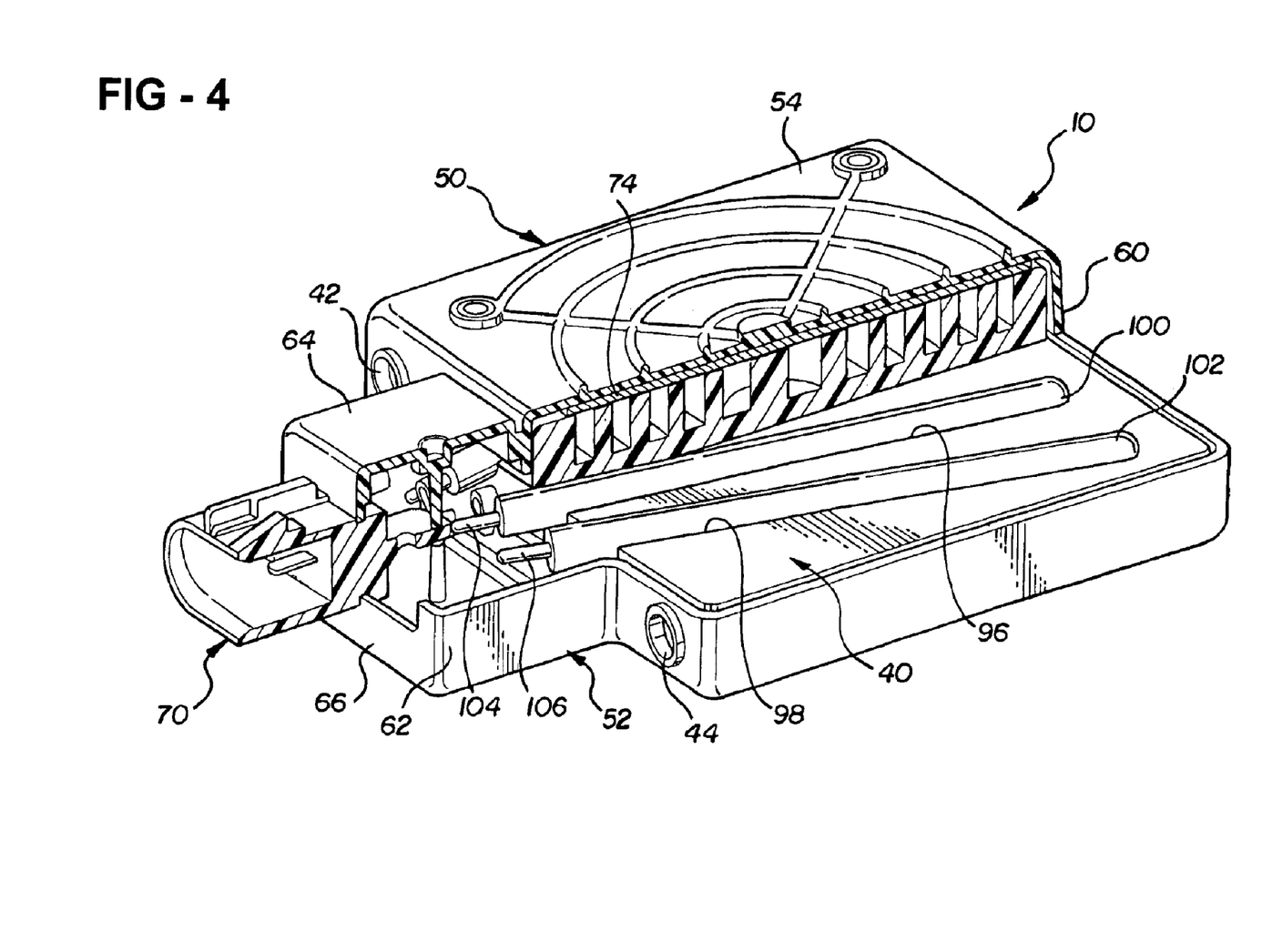
FIG. 4 is a partially broken away, perspective view of the heater module shown in FIG. 2.
Figure 5:
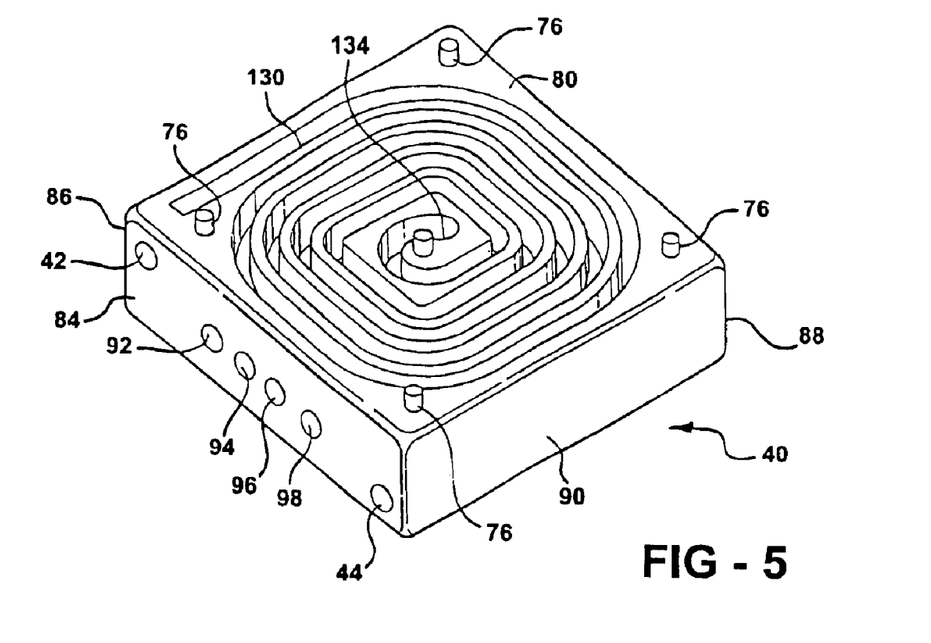
FIG. 5 is a top perspective view of the heater module thermal mass.

The heater module 10 includes a heat exchange mass or body 40 formed of a suitable high thermally conductive material. Although the mass 40 is described as being formed of diecast, molded or machined aluminum, other materials, either homogenous or non-homogenous, may also be employed. For example, the mass 40 can be formed of alumina particles, ceramic materials, etc.

The mass 40, as described in greater detail hereafter, includes a fluid flow path between an inlet 42 and an outlet 44. The inlet and outlet 42 and 44, respectively, receive a fitting 46 and an outer sleeve 48 which are joined together for receiving a fluid sealed connection to a fluid flow conduit, element or tube, not shown. The inlet 42 will be connected to receive the pump output from the window wash fluid reservoir 20; while the outlet 44 will be connected to the spray nozzle(s) 14.

As vehicles typically have several spray nozzles 14, usually one for each of the two windshield wipers, and at least one nozzle 14 for the rear backlight or rear window wiper, it will be understood that the following description of a single heater module 10 for heating all of the fluid discharge from the fluid reservoir 20 will encompass multiple parallel paths, each containing a separate heater module, for heating fluid from the reservoir 20 for each different nozzle 14.

The heat exchange body 40 is disposed within an insulated housing formed by a first housing part 50 and a mating second housing part 52. The first and second housing parts 50 and 52 have complementary shapes with a major wall surface 54 and 56, respectively, and a surrounding peripheral lip 60 and 62, respectively.

A necked-down end portion 64 and 66 is formed in each first and second housing part 50 and 52, and forms an extension from one end of the respective major walls 54 and 56 as well as from the peripheral edge lips 60 and 62. The necked-down portions 64 and 66, when joined together, form an end cavity for receiving a connector assembly 70 which connects electrical conductors to the heating element (s) mounted in the joined first and second housing parts 50 and 52.

Seal members 74 and 75, formed of a resilient and thermally insulating material, are interposed between the opposed major surfaces of the heat exchange body 40 and the inner surfaces of the major walls 54 and 56 of the first and second housing parts 50 and 52, respectively. The seals 74 and 75 seal the open ends of the fluid flow channels or paths, described hereafter, in the opposed major surfaces of the heat exchange body 40.

The first and second housing parts 50 and 52 and the heat exchange body 40 are fixedly joined together, after the connector assembly 70 has been disposed in the extension 64 and 66 of the first and second housing parts 50 and 52 by suitable means, such as by heat stake rivets or projections 76 projecting outwardly from opposite major surfaces of the heat exchange body 40. The projections 76 engage apertures 64 in the major surfaces 60 and 62 of the first and second housing parts 50 and 52 and are heat welded together to join the first and second housing parts 50 and 52 together in a fixed connection; while maintaining the seal elements 74 and 76 in tight contact with the open ends of the fluid flow paths in the heat exchange body 40.

As shown in detail in FIGS. 4–7, the heat exchange mass or body 40 has a solid cubical shape formed of a first major surface 80, a second opposed major surface 82, and four sidewalls 84, 86, 88 and 90, interconnecting the first and second surfaces 80 and 82.

A plurality of bores 92, 94, 96 and 98 are formed in the body 40 and project inwardly from the sidewall 84. The bores 92, 94, 96 and 98 are each adapted for receiving one generally cylindrical heater element. As partially shown in FIG. 4, each bore, such as bores 96 and 98, extend through the solid central portion of the body 40 so as to be completely surrounded by the solid material of the body 40. This defines the body 40 as a heat source after receiving heat from activation of the heater elements describe hereafter.

In the aspect of the invention shown in FIGS. 4–7, the heater elements are formed of "calrod". Although different materials many be used, one example of a calrod construction is a Nichrome wire inside of a stainless steel sheath.

By way of example only, at least one and preferably a plurality, i.e., two or three or more individual heater elements 100, 102 and 103, with only heater elements 100, 102 being shown in FIG. 4, are disposed in the bores 96, 94 and 98. The function of the one or more heater elements, such as heater elements 100 and 102, will be described hereafter in conjunction with the description of the heater module 10.

Figure 7:
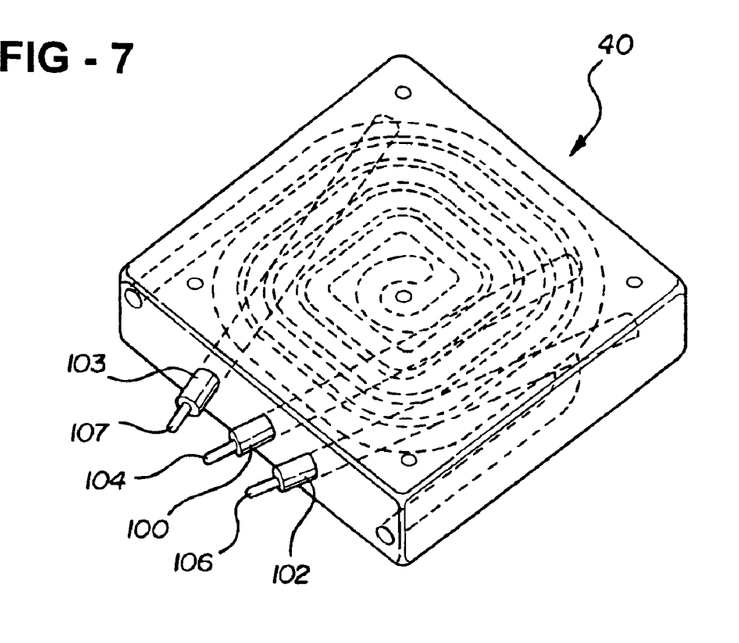
FIG. 7 is a perspective view of the interior of the heater module thermal mass shown in FIGS. 5 and 6.
Figure 8:
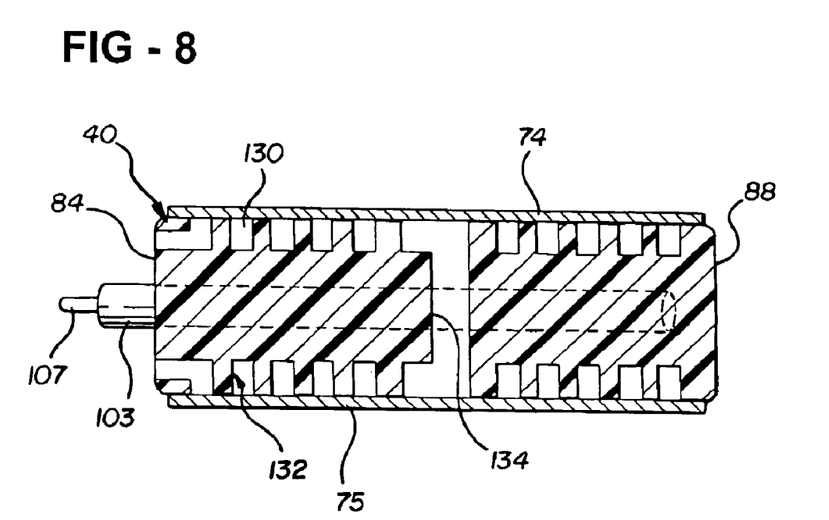
FIG. 8 is a side, cross sectional view of the heater module thermal mass shown in FIGS. 2–7.

As seen in FIGS. 4 and 7, one end 104, 106 and 107 of each heater element, elements 100, 102 and 103, respectively, projects outwardly through the sidewall 84 of the body 40. The ends 104, 106 and 107 of the heater elements 100, 102 and 103 respectively, engage individual terminals 108 formed at one end of a grid assembly 110 shown in detail in FIG. 9. The grid assembly 110 is initially formed as a single element wherein individual terminals 112 are unitarily joined together by interconnecting tabs 114. The tabs 114 are later separated from the terminals 112 to provide a separate contact for each heater element 100, 102 and 103. One terminal 112 is connected to a ground rod. The grid assembly 100 is mounted in a connector housing 116 having a generally cylindrical shape with a hollow interior. One end of the terminals 112 is connected to a circuit board 113 shown in FIG. 3. The circuit board 113 is fixedly mounted by suitable locating pins in the cavity formed by the extensions 64 and 66 of the first and second housing parts 50 and 52. One of the terminals 112 acts as a ground lead in that an end portion is disposed in contact with the outer stainless steel sheath of each heater element or calrod 100, 102 and 103. Another of the terminals 112 is the power lead for calrod 100. This terminal 112 provides electric power to the calrod 100 through contact with the end 104 of heater element 100 in the grid assembly 110.

Figure 9:
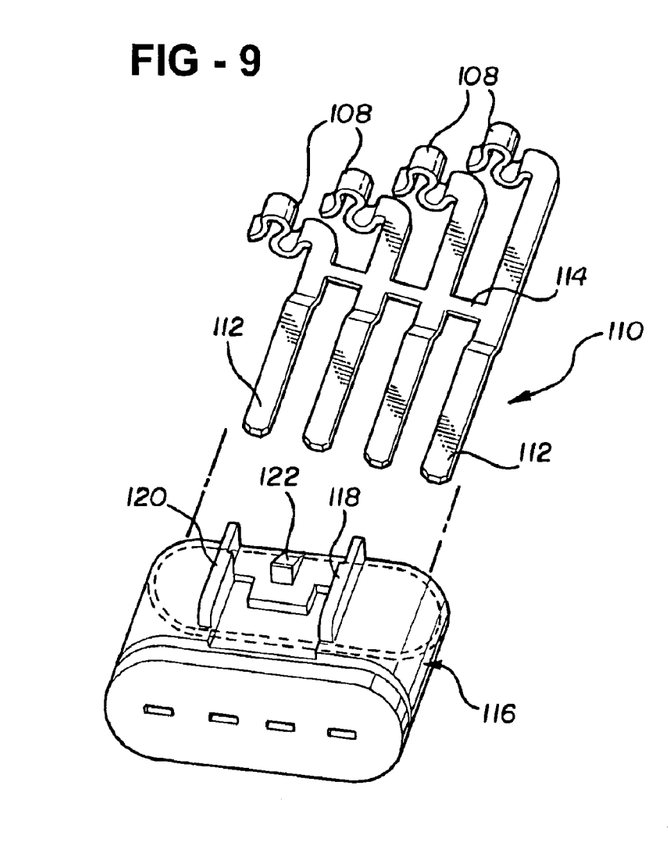
FIG. 9 is an exploded, perspective view of the connector housing and terminals employed in the heater module shown in the previous drawing figures.

The other two terminals 112 provide power connections to the other two heater elements 102 and 103. A switch, not shown, may be interposed between the terminal 112 and the other two terminals 112 to selectively provide power to the other two terminals 112 when power is supplied to the power terminal. This switch can be a bi-metal switch, for example, which will open at a predetermined temperature, such as 50° C., as described hereafter. Alternately, a switch controlled by the circuitry on the circuit board 113 of the controller 28 will selectively connect power from the power terminal 112 to the other terminals 112. This provides the controller 28 with the capability, when receiving suitable external input signals from the vehicle body controller, for example, to deactivate the heater module 10, during the occurrence of low vehicle battery power, a thermal event, etc.

Figure 10:
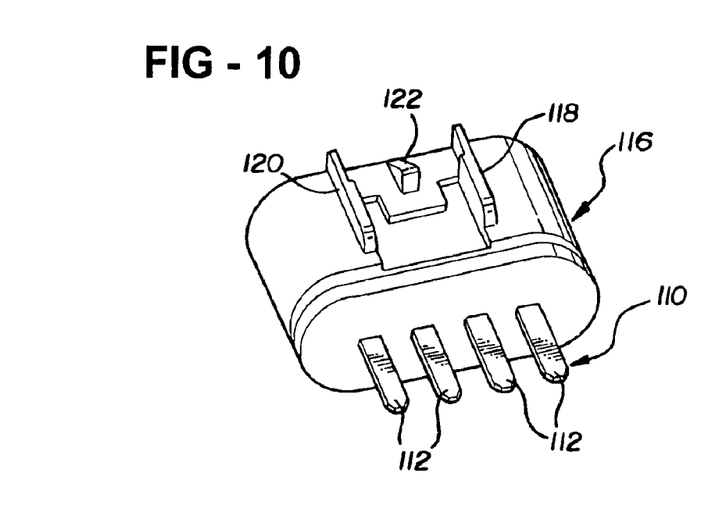
FIG. 10 is a perspective view of the assembled connector housing and terminals shown in FIG. 9.

As shown in FIG. 10, another set of terminals 115, mounted in the connector housing 116, are connected internally to the circuit board 113 to provide the power, ground and external signals to the circuit board 113 as described above.

The connector housing 116 includes a pair of spaced walls 118 and 120 formed along one side edge and an intermediate latch projection 122. The walls 118 and 120 and the latch projection 122 mate with complementary recesses and a latch receiver, not shown, in a complementary connection engagable with the connector housing 116. The mating connector will include sockets which receive the terminals 115.

As shown in FIGS. 4–7, the thermally conductive mass or body 40 includes a fluid flow channel or path which extends from the inlet 42 to the outlet 44. The fluid flow path has a labyrinthian path formed of a first fluid flow path portion 130 and a second fluid flow path or channel 132 which are connected at a generally centrally disposed bore 134. The first fluid flow channel 130 has a generally spiral shape formed of alternating straight and arcuate sections which alternate create laminar and turbulent flow of the fluid passing through the first flow channel 130 to maximize the heat absorption of the fluid from the adjoining walls of the mass 40. Further, the first fluid flow channel 130 has an inward directed spiral shape from the inlet 42 to the bore 134 to minimize temperature differential between adjoining portions of the spiral shaped first flow channel 130.

Figure 6:
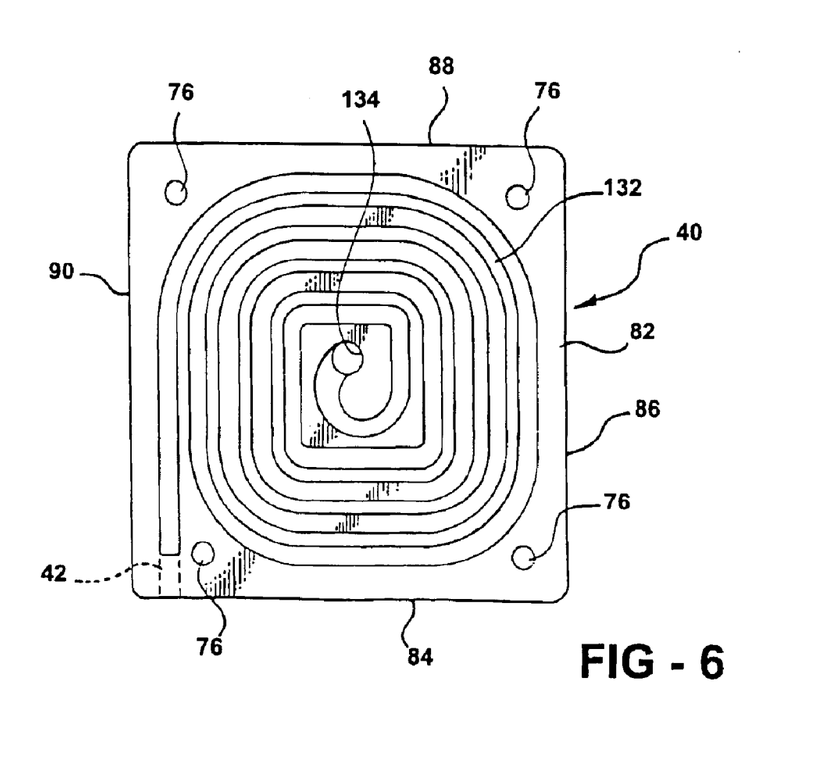
FIG. 6 is a bottom elevational view of the heater module thermal mass shown in FIG. 5.

As shown in FIG. 6, the second fluid flow channel 132 has a substantially identical spiral shape. However, fluid flow through the second fluid flow channel 132 is in a outward spiral direction from the bore 134 to the outlet 44. As described above, the seal members 74 and 75 sealingly close the open ends of the first and second fluid flow channels 130 and 132.

Thus, fluid flow through the first and second flow channels 130 and 132 starts from the inlet 44 then continues in a spirally inward directed manner through the first flow channel 130 to the central passage or bore 134. Upon exiting the central passage 134 into the second flow channel 132, fluid flow progresses in an outward spiral direction through the second flow channel 132 to the outlet 44.

In operation, the heater module 40 will be interconnected in the vehicle wash fluid flow lines between the pump 22 and the spray nozzle(s) 14 as shown in FIG. 1. The external connector is then connected to the connector housing 70 to provide electric power from the vehicle battery 26 and the controller 28 to the heater elements 100, 102 and 103, in the heat exchange body 40.

Assuming that the first and second fluid flow channels 130 and 132 in the body 40 are filled with fluid, when the controller 28 activates the heater elements 100, 102 and 103, the heater elements 100, 102 and 103 will begin radiating heat which will immediately raise the temperature of the entire surrounding portion of the heat exchange body 40. Heat from the body 40 will, in turn, be radiated to and absorbed by the fluid disposed in the first and second flow channels 130 and 132.

The straight and arcuate portions of the first and second fluid flow channels 130 and 132 create alternating turbulent and laminar flow regions in the fluid flowing through the mass 40 which causes movement of the fluid in the first and second flow channels 130 and 132 bringing all molecules in the fluid in contact with the wall of the body 40 forming the first and second flow channels 130 and 132 to efficiently absorb the maximum amount of heat possible. This causes the temperature of the fluid to be quickly raised from ambient temperature at the inlet 42 to approximately 160° F.–170° F. at the outlet 44 in approximately sixty seconds.

The fluid in the first and second fluid flow channels 130 and 132 removes or absorbs heat from the thermal mass 40 thereby increasing the fluid temperature by physical contact with the mass 40. The heater elements 100, 102 and 103 maintain the heat of the thermal mass 40 at a predetermined temperature thereby preventing hot spots from occurring in the fluid. Normally, hot spots would occur when the fluid comes in direct contact the heater elements 100, 102 and 103. Fluid which is not in physical contact with the heater elements 100, 102 and 103 passes the heater elements 100, 102 and 103 by and does not absorb heat. By heating the thermal mass 40, the physical hot contact area is increased along with an increase in heat transfer efficiency. This requires less energy to heat the same volume of fluid.

Although a single heater element 100 may be employed as the heat source in the body 40, multiple heater elements, with two or three heater elements, 100, 102 and 103, being described by way of example only, have been found to be most advantageous. The controller 28 can activate all of the plurality of heater elements 100, 102 and 103 upon receiving a first command to dispense heated wash fluid onto the windshield 12. This generates a maximum amount of heat to the body 40 to immediately and quickly raise the temperature of the body 40 high enough to transfer sufficient heat to the fluid in the fluid flow channels 130 and 132 to raise the temperature of the fluid to the desired discharge temperature of 160° F.–170° F. The multiple heater elements 100, 102 and 103 can remain in an activated state by the controller 28 if immediate and successive commands from the on/off switch 24 are supplied by the vehicle driver to supply additional charges of fluid onto the windshield 12.

At the completion of the fluid dispensing operation, and during other periods of non-fluid dispensing while the vehicle ignition is still "on", the controller 28 can cyclically activate one or more of the heater elements, such as heater element 100, to maintain the temperature of the fluid in the first and second flow channels 130 and 132 at an elevated temperature for immediate discharge onto the windshield 12 when activated by the on/off switch 24. This minimizes electrical power requirements on the vehicle battery 26.

Although the controller 28 can provide separate switchable signals to each of the heater elements 100, 102 and 103, in order to control each heater element 100, 102 and 103 separately under program or logic control, one simple approach includes the bi-metal element or a switch mounted between the power connections to one terminal 112 and each of the other terminals 112 connected to the additional heater elements 102 and 103. The bi-metal element can be set to open at a predetermined temperature, such as 50° C., thereby deactivating the associated heater element. This enables the additional heater elements 102 and 103, for example, to remain deactivated until a high heat requirement is initiated.

Referring back to FIG. 1, at least one valve is associated with the optional heater 11A or 11B, such as valves 130 and 132. The valves 130, 132 provide switching between an inlet fluid flow path from the pump 22 or from the outlet of the heater 11A or 11B to one of a plurality of fluid distribution pathways, typically in the form of conduits or hoses, such as hoses 134 and 136 extending from the switch 130, or hoses 138 and 140 extending from the valve 132. The fluid pathways 134, 136, 138, and 140 extend to the respective nozzles or distribution devices 14, 4, 5, and 6 to dispense the pressurized fluid onto the selected surface to be cleaned. Which surface is to be cleaned is determined by a selection switch means 24 which can be one multiple position switch allowing selection of one of all of the selectable cleanable surfaces on the vehicle or multiple, separate switches, each of which has an output connected as an input to the controller 28. In this manner, independent selection of one cleanable surface 7, 8, 9, or 12 and/or combinations of at least two or more surfaces to be cleaned simultaneously can be accomplished.

The valve 130 or 132 may take one of several different valve configurations, such as an automatic, pressure responsive valve, an electrically controlled solenoid valve, a manually movable valve, etc. The valves, 130, 132 while depicted as being switchable between two different flow positions; may be formed of other valve arrangements, such as a two-way, blocked center valve, a pilot operated valve, a three position valve having three separate, distinct outlet flow ports, etc.

Figure 11:
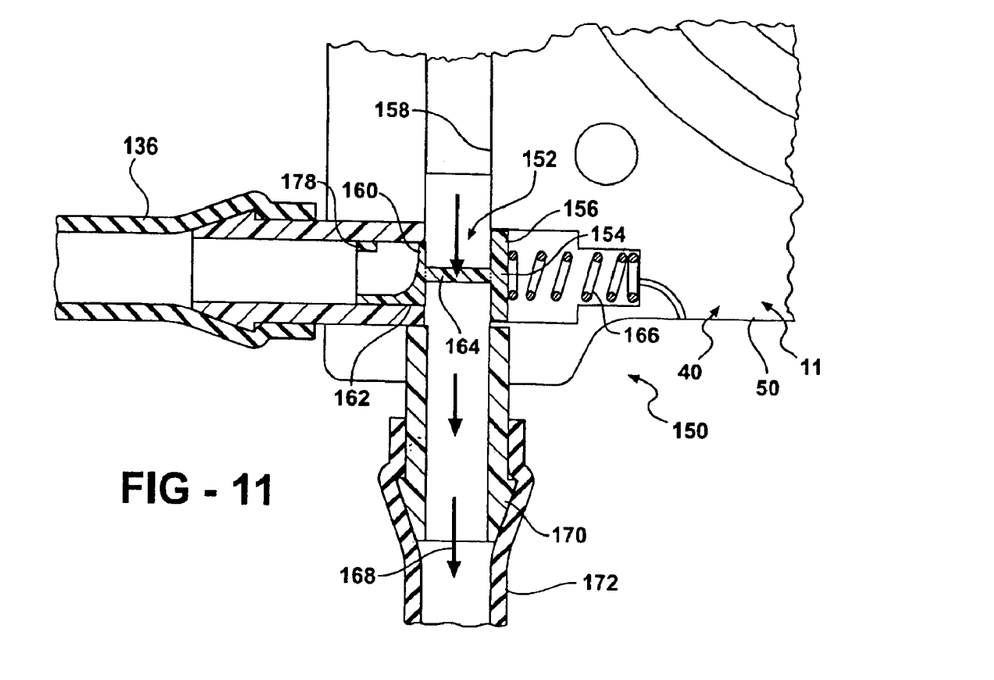
FIG. 11 is partial, plan elevational view of the heater of FIGS. 2–10 including an automatic switchable valve for dispensing wash fluid in two distinct paths according to the present invention.
Figure 12:
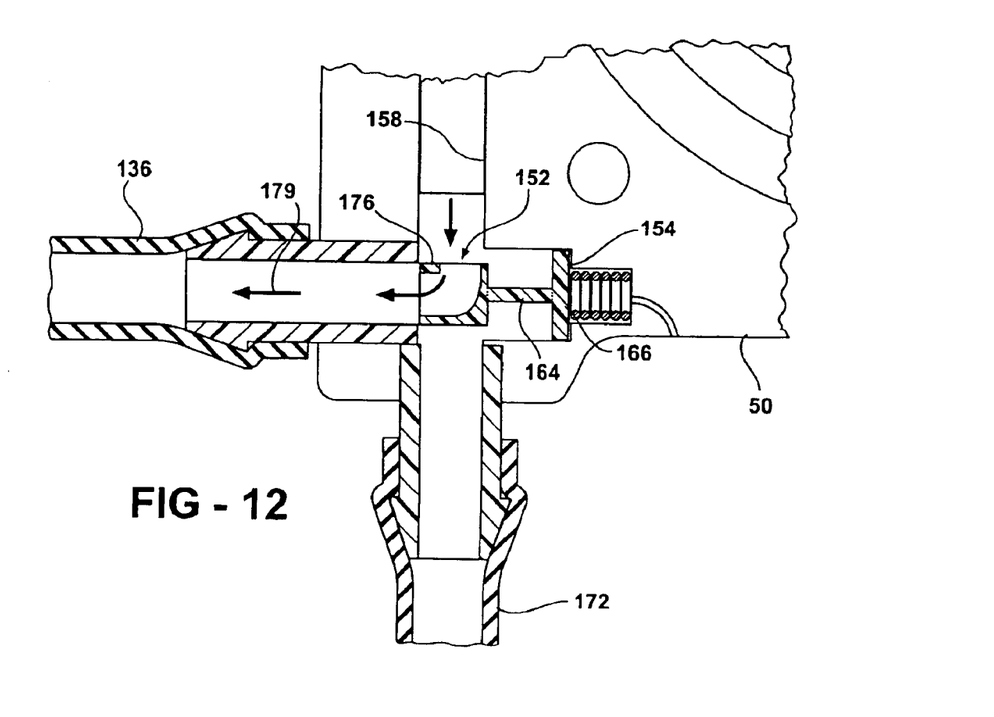
FIG. 12 is a plan elevational view of the valve shown in FIG. 10, depicted in a second position.

One example of a valve 130 or 132 usable in the present invention is shown in FIGS. 11 and 12. In this aspect of the invention, the valve denoted by reference number 150 is mounted in the housing of the heater 11 in mating recesses, for example, formed between the two mating heater housing sections 50 and 52.

By way of example only, the valve 150 includes a movable plunger 152 having a first seal member 154 which blocks a first port 156 in an outlet bore 158 in the heater housing 40, an opposed second seal member 160 which blocks an opposed second port 162 in the heater housing and a connector rib or member 164 joining the first and second seal members 154 and 160 together into a unitary structure. The plunger 152 is preferable formed of a resilient material to effect fluid sealing of the ports 156 and 162.

A positioning means in the form of a biasing spring 166 is mounted in the recess in the heater housing 40 and provides a predetermined spring pressure or force against the plunger 152 to normally bias the plunger 152 to a first position depicted in FIG. 11. In this position, the rib 164 extends laterally across the outlet bore 158 so as to allow fluid flow through the bore 158 in the direction of arrow 168. This outlet flow is through a first barbed end 170 which receives a first fluid flow distribution conduit or hose 172 for distribution to a first vehicle cleanable surface, such as through the nozzles 14 onto the vehicle windshield 12.

However, the valve 150 is pressure responsive such that fluid flowing through the bore 158 at a pressure above a predetermined magnitude will overcome the biasing force exerted by the spring 166 and force the plunger 152 to the right in the orientation shown in FIG. 12 compressing the spring 166 and moving the plunger 152 until the second seal member 160 is disposed in and blocks the first port 156. This movement causes an annular member 164 extending laterally from the second seal member 160 to slide into the bore 158 and be positioned laterally across the bore 158. An aperture 176 formed in the member 164 is open to the bore 158. The member 164 includes an outlet 178 which causes fluid flowing from the heater 10 through the bore 158 to exit in the direction of arrow 179 through the outlet 178 to a second distribution conduit 136 which can be the second distribution conduit extending to the nozzles 4 directed to the second cleanable surface 70 on the vehicle.

The pressure can be increased by applying more current to the pump motor thereby increasing the speed of pump rotation resulting in a greater pressure fluid discharge from the pump. When cleaning of the surface 7 is to be discontinued, the pump speed is reduced to zero. This pressure reduction causes the spring 166 to move the plunger 152 back to the first position shown in FIG. 11.

An optional bore 167 is shown in FIG. 11 from the recess containing the spring 166 to atmosphere. The bore 167 can be attached to a pilot pressure line or just vent to atmosphere to prebias linear movement of the spring 166 in at least one direction.

Figure 13:
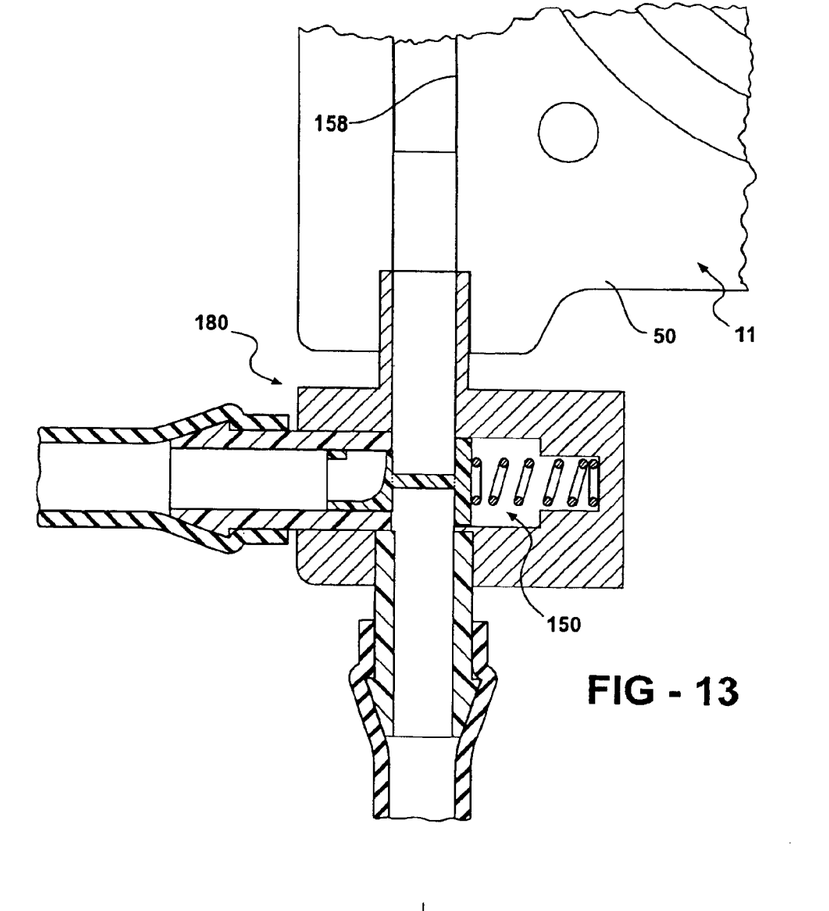
FIG. 13 is a plan elevational view of an alternate mounting position of the valve shown in FIGS. 11 and 12 external to the optional heater.

Since the heater 11A or 11B is optional, the valve 150 can be provided in a separate valve body 180 in FIG. 13, which is separate from the single heater outlet 158 or connected directly to one outlet of the pump 22. The operation of the valve 150 in the valve body 180 is identical to that described above for the valve 150 shown in FIGS. 11 and 12 such that the valve 150 can selectively select direct pressurized fluid flow to two distinct cleanable surfaces 7 or 12 depending upon the fluid pressure from the pump 22.

Figure 14:
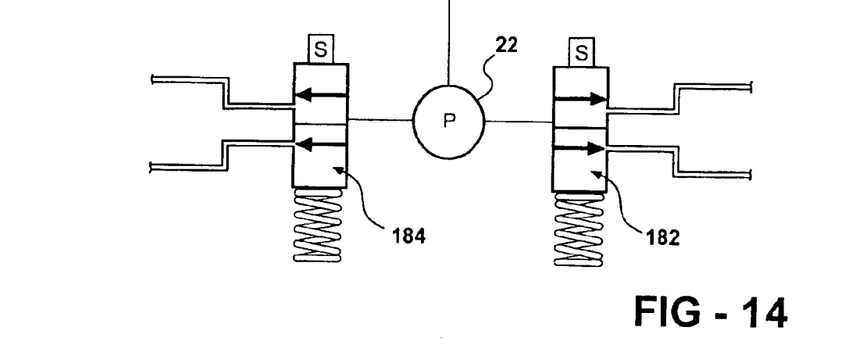
FIG. 14 is a schematic representation of another aspect of a vehicle surface wash apparatus according to the present invention.

It will be clearly seen from FIG. 14 that the pressure responsive valve 150 can be replaced with an electric solenoid operated valve 182, 184 each having two distinct positions, one depicted as a normal position and a second switched position caused by movement of the plunger when the electric solenoid is activated by the controller 28 or by a direct signal from the cleanable surface select switch 24. The operation of the electric solenoid valve 182, 184 is identical to the pressure responsive valve 150 except that the pressure of the fluid flowing through the solenoid operated valve remains regardless which outlet flow path 134 or 136 is selected.

Additional surfaces 8 and 9 can also be selected for independent cleaning by the application of wash fluid from the reservoir 20 by the use of a second valve 132 with or without a second heater 11B. The valve 132 is connected directed to the another discharge outlet of the pump 22 or receives pressurized fluid from the pump 22 which has been heated by the heater 11B.

Alternately, the valve 132 could be connected in parallel with the valve 134 and provided with separate discharge paths so as to receive a single outlet flow from the pump 22 along with the valve 130. Control of which surface is to be cleaned is under the control of valves 130 and 132.

In the aspect of the invention shown in FIG. 1, the valve 132 is designed to receive pressurized fluid from a discharge outlet of the pump 22 only with the pump 22 is rotated in a opposite direction from the direction of rotation which applies pressurized fluid to the valve 130. In this manner, selection of the cleanable surfaces 8 or 9 can be made totally independent of the surfaces 7 and 12 by merely changing direction of rotation of the pump impeller 22. This allows the valve 132 to be identical in structure and operation as the valve 150 even though the valve 132 and 130 are selected independently and automatically by the direction of rotation of the pump impeller which is controlled by the controller 28 in response to a cleanable surface select switch 24 input.

In FIG. 14, the dual position valves 180 and 182 shown in a fluid circuit independent of any heater 11A or 11B. Each valve 180 and 182 is connected to a separate discharge outlet of the pump 22 and receives pressurized fluid only in response to a distinct direction of rotation of the pump impeller. Rotation of the pump impeller in one direction will cause pressurized fluid to flow only to the valve 130. Rotation of the pump impeller in an opposite direction will cause pressurized fluid to flow only to the valve 132.

The pressure responsive valve operation of the valve 150 and the pump impeller rotation discharge outlet selection feature shown in FIGS. 1 and 14 can be combined so as to provide for distinct cleaning of surfaces 7 and 12 by the valve 130 and the surfaces 8 and 9 by the valve 132 in response to the direction of rotation of the pump impeller and the pressure of fluid discharge by the pump 22. The fluid may be discharged to the surface 12 at a first low pressure or to the surface 7 at a second higher pressure when the pump impeller rotates is in a first direction. Pressurized fluid flow at a first low pressure can be directed through valve 132 to a surface 8 and a second higher pressure to the surface 9 when the direction of rotation of the pump impeller is in an opposite direction. This allows four distinct surfaces to be cleaned through the use of only two valves without separate excessive controls being required for the valves. The only control required is a control input to select the direction of rotation of the pump impeller to select which valve is to be influenced by the pressure of the fluid flow from the pump 22.

In summary, there has been disclosed a unique vehicle exterior surface which enables one or more of a plurality of exterior vehicle surfaces to receive pressurized wash fluid by switchable valve means and by fluid distribution determined by pump outlet flow direction and/or pressure.

What is claimed is:

1. A vehicle exterior surface wash apparatus comprising:
a source of pressurized wash fluid;
fluid distribution means, cooperative with the source of pressurized fluid, for distributing fluid from the source to at least three different exterior vehicle surfaces;
valve means, coupled to the fluid distribution means, and switchable for directing fluid to at least one of the at least three different vehicle surfaces;
heater means, fluidically coupled between the source of pressurized fluid and the valve means, for heating fluid from the source prior to distribution onto the surfaces;
a pump coupled to the source and operable at at least two different fluid discharge pressures; and
the valve means being responsive to the at least two different pump fluid discharge pressures to direct fluid to at least two different vehicle exterior surfaces.

2. The wash apparatus of claim 1 wherein the valve means comprises:
a pressure responsive valve automatically responsive to different fluid pressures for switching between at least two positions.

3. The wash apparatus of claim 1 comprising:
pump means, coupled to the source of pressurized fluid, for pumping pressurized fluid from the source, the pump means operable in two different direction, to supply pressurized fluid to two distinct fluid distribution means in response to the direction of pump operation.

4. The wash apparatus of claim 1 wherein:
the valve means is mounted in the heater means and controls heated fluid flow from the heater means in one of at least two distinct fluid paths.

5. The wash apparatus of claim 4 wherein:
the valve means is responsive to the fluid pressure for switching between at least first and second positions, respectively, fluidically coupled to the at least two fluid paths.

6. The wash apparatus of claim 4 wherein:
the valve means is an electrically controlled valve switchable between the at least two positions.

7. The wash apparatus of claim 1 wherein:
the valve means is external to the heater means and coupled between a heater discharge outlet and the vehicle surfaces.

8. A vehicle exterior surface wash apparatus comprising:
a supply of wash fluid;
a pump for supplying wash fluid from the reservoir at at least two fluid pressures;
means for distributing fluid from the pump to at least two vehicle exterior surfaces prior to distribution onto the surfaces;
valve means, responsive to the at least two fluid pressure pressures, for switching between positions respectively directing fluid flow through the fluid distributing means to the at least two exterior surfaces and heater means, fluidically coupled between the source of pressurized fluid and the valve means, for heating fluid from the source prior to distribution onto the surfaces.

9. A wash apparatus for vehicle exterior surfaces comprising:

the source of pressurized wash fluid;

fluid distribution means, cooperative with the source of pressurized fluid, for distributing fluid from the source to at least three different exterior vehicle surfaces;

valve means, coupled to the fluid distribution fluid means and switchable between a plurality of distinct positions, for directing fluid to at least one of the three different vehicle surfaces;

heater means, coupled between the source of pressurized fluid and the fluid distribution means, for distributing heated fluid to the valve means; and a pump, coupled to the source, and rotatable in one of two opposed directions and one of two different speeds to create two different fluid outlet pressures.

* * * * *